US011772712B2

(12) United States Patent
Storz et al.

(10) Patent No.: US 11,772,712 B2
(45) Date of Patent: *Oct. 3, 2023

(54) COMPOSITE FLOOR WITH INTEGRATED CONDUIT

(71) Applicant: Wabash National L.P., Lafayette, IN (US)

(72) Inventors: Scott A. Storz, Lafayette, IN (US); Travis Smith McCloud, Malabar, FL (US); Andrzej Wylezinski, Lafayette, IN (US); Mark Ehrlich, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,646

(22) Filed: Jun. 10, 2022

(65) Prior Publication Data

US 2022/0306214 A1 Sep. 29, 2022

Related U.S. Application Data

(63) Continuation of application No. 16/656,109, filed on Oct. 17, 2019, now Pat. No. 11,358,652.

(60) Provisional application No. 62/748,857, filed on Oct. 22, 2018.

(51) Int. Cl.
| | |
|---|---|
| *B62D 25/20* | (2006.01) |
| *B62D 29/04* | (2006.01) |
| *B62D 33/04* | (2006.01) |
| *B62D 53/06* | (2006.01) |
| *B62D 63/06* | (2006.01) |

(52) U.S. Cl.
CPC ....... *B62D 25/2054* (2013.01); *B62D 29/043* (2013.01); *B62D 33/04* (2013.01); *B62D 53/06* (2013.01); *B62D 63/06* (2013.01)

(58) Field of Classification Search
CPC ............ B62D 25/2054; B62D 25/2036; B62D 33/044; B62D 33/04; B62D 33/046; B62D 29/043; B62D 21/20; B62D 53/06; B62D 63/06
See application file for complete search history.

(56) References Cited

U.S. PATENT DOCUMENTS

| | | | |
|---|---|---|---|
| 3,243,201 A | 3/1966 | Bock | |
| 3,994,105 A | 11/1976 | Jamison et al. | |
| 4,613,182 A | 9/1986 | Stone | |
| 4,703,948 A * | 11/1987 | Ehrlich | ................. B62D 21/17 105/422 |

(Continued)

FOREIGN PATENT DOCUMENTS

WO 2016/137974 A1 9/2016

*Primary Examiner* — Gregory A Blankenship
(74) *Attorney, Agent, or Firm* — Faegre Drinker Biddle & Reath LLP (57) ABSTRACT

A cargo vehicle is disclosed having a composite floor assembly with at least one conduit extending along a length of the composite floor assembly. The at least one conduit may include a first internal cavity and a second internal cavity. The first internal cavity may be configured to route at least one vehicle component. The second internal cavity may be configured to receive at least one vehicle component or a plurality of mechanical fasteners. The mechanical fasteners may be used to couple a base rail to the composite floor assembly.

19 Claims, 10 Drawing Sheets

(56) References Cited

U.S. PATENT DOCUMENTS

| | | | | |
|---|---|---|---|---|
| 4,940,279 | A * | 7/1990 | Abott | B32B 7/12 |
| | | | | 52/309.8 |
| 5,429,066 | A | 7/1995 | Lewit et al. | |
| 5,553,906 | A | 9/1996 | Kunz | |
| 5,588,693 | A * | 12/1996 | Higginson | B62D 33/046 |
| | | | | 296/29 |
| 5,664,518 | A | 9/1997 | Lewit et al. | |
| 5,800,749 | A | 9/1998 | Lewit et al. | |
| 5,830,308 | A | 11/1998 | Reichard | |
| 5,890,757 | A | 4/1999 | Masterson et al. | |
| 5,897,818 | A | 4/1999 | Lewit et al. | |
| 5,908,591 | A | 6/1999 | Lewit et al. | |
| 5,997,075 | A | 12/1999 | Dunder et al. | |
| 6,004,492 | A | 12/1999 | Lewit et al. | |
| 6,013,213 | A | 1/2000 | Lewit et al. | |
| 6,206,669 | B1 | 3/2001 | Lewit et al. | |
| 6,270,150 | B1 * | 8/2001 | Miller | B62D 21/17 |
| | | | | 296/184.1 |
| 6,496,190 | B1 | 12/2002 | Driemeyer et al. | |
| 6,505,883 | B1 * | 1/2003 | Ehrlich | B62D 33/04 |
| | | | | 296/181.6 |
| 6,543,469 | B2 | 4/2003 | Lewit et al. | |
| 6,615,741 | B2 | 9/2003 | Fecko | |
| 6,723,273 | B2 | 4/2004 | Johnson et al. | |
| 6,755,998 | B1 | 6/2004 | Reichard et al. | |
| 6,869,561 | B2 | 3/2005 | Johnson et al. | |
| 6,911,252 | B2 | 6/2005 | Lewit et al. | |
| 7,270,346 | B2 * | 9/2007 | Rowe | B60G 17/04 |
| | | | | 280/781 |
| 8,118,345 | B1 | 2/2012 | Hootman | |
| 8,186,747 | B2 * | 5/2012 | Bloodworth | B62D 29/043 |
| | | | | 180/209 |
| 8,474,871 | B1 | 7/2013 | Ludwick | |
| 9,371,468 | B2 | 6/2016 | Lewit | |
| 10,000,242 | B2 * | 6/2018 | Jaworski | B60R 13/07 |
| 10,239,265 | B2 | 3/2019 | Lewit et al. | |
| 10,479,419 | B2 | 11/2019 | Storz et al. | |
| 10,549,789 | B2 | 2/2020 | McCloud | |
| 10,919,579 | B2 | 2/2021 | McCloud et al. | |
| 11,358,652 | B2 | 6/2022 | Storz et al. | |
| 11,358,662 | B2 * | 6/2022 | Wang | B62D 55/092 |
| 2003/0107238 | A1 * | 6/2003 | McWilliams | B62D 33/046 |
| | | | | 296/186.1 |
| 2010/0264624 | A1 | 10/2010 | McNeil et al. | |
| 2016/0263873 | A1 | 9/2016 | Lewit | |
| 2017/0015361 | A1 * | 1/2017 | Koch | B62D 25/025 |
| 2017/0240217 | A1 * | 8/2017 | Storz | B62D 21/02 |
| 2019/0152546 | A1 * | 5/2019 | Jones | B62D 21/20 |
| 2020/0122783 | A1 | 4/2020 | Storz et al. | |
| 2022/0379975 | A1 * | 12/2022 | Bykovskyi | B62D 21/17 |

\* cited by examiner

COMPOSITE FLOOR WITH INTEGRATED CONDUIT

CROSS REFERENCE TO RELATED APPLICATIONS

This application is a continuation of U.S. application Ser. No. 16/656,109, filed Oct. 17, 2019 and issued as U.S. Pat. No. 11,358,652 on Jun. 14, 2022, which claims priority to U.S. Provisional Patent Application Ser. No. 62/748,857, filed Oct. 22, 2018, the disclosures of which are hereby expressly incorporated by reference herein in their entireties.

FIELD OF THE DISCLOSURE

The present disclosure relates generally to composite floor structures and methods of making the same. More particularly, the present disclosure relates to composite floor structures of cargo vehicles with one or more conduits configured to route vehicle components and methods of making the same.

BACKGROUND OF THE DISCLOSURE

Cargo vehicles are used in the transportation industry for transporting many different types of cargo. Cargo vehicles may be constructed using composite materials, which may lead to an absence of or reduction in metallic and wood materials and associated advantages, including simplified construction, thermal efficiency, reduced water intrusion and corrosion, and improved fuel efficiency through weight reduction, for example. Cargo vehicles constructed using composite materials may also allow for maximizing the amount of interior storage space of the cargo vehicle while maintaining a suitable overall height of the cargo vehicle. Maximizing the amount of interior storage space may occur when, for example, a connection height between a rear slide rail assembly and a composite floor assembly is minimized. Minimizing the connection height between the rear slide rail assembly and the composite floor assembly may make it desirable to route vehicle components, such as air hoses or electrical cables, through an internal path of the cargo vehicle. Moreover, it is desirable to route the vehicle components through an internal path in order to limit the exposure of the vehicle components to weather and road debris.

SUMMARY OF THE DISCLOSURE

A cargo vehicle is disclosed having a composite floor assembly with at least one conduit. The conduit may be used to internally route vehicle components, such as an air hose and/or an electrical cable, along a length of the composite floor assembly. The conduit may be adhered to the composite floor assembly and assist in coupling the composite floor assembly to sidewalls of the cargo vehicle.

According to an exemplary embodiment of the present disclosure, a cargo body is provided including a composite floor assembly having a first longitudinal end and a second longitudinal end spaced apart from the first longitudinal end along a floor longitudinal axis. The cargo body further includes a first conduit coupled to the composite floor assembly and including a first and a second internal cavity. The first and second internal cavities of the first conduit may extend along a length of the first conduit parallel to the floor longitudinal axis.

According to another exemplary embodiment of the present disclosure, a cargo body is provided including a composite floor assembly having a plurality of transverse composite beams oriented generally perpendicular to a longitudinal axis of the composite floor assembly. A first longitudinal end of each of the plurality of transverse composite beams defines a first side of the composite floor assembly and has a first shape. The cargo body further includes a first conduit coupled to the first side of the composite floor assembly. The first conduit includes a first wall having a second shape complementary to the first shape.

According to a further exemplary embodiment of the present disclosure, a conduit for a base rail for a floor assembly of a cargo body is provided including an exterior boundary defined by at least a first wall, a second wall, and a third wall. The second wall intersects the first wall, and the third wall intersects at least one of the first and second walls. The conduit further includes a midwall coupled to at least one of the first, second, and third walls. In addition, the midwall defines a first internal cavity and a second internal cavity.

According to another exemplary embodiment of the present disclosure, a cargo body is provided having a front end, a rear end, a longitudinal axis extending from the front end to the rear end, a left side, and a right side. The cargo body includes a composite floor assembly, a composite sidewall extending in a direction parallel to the longitudinal axis, a base rail coupling the composite sidewall to the composite floor assembly, and a conduit disposed between the base rail and the composite floor assembly. The conduit includes a first internal cavity configured to route at least one vehicle component and a second internal cavity configured to receive a plurality of fasteners that couple the base rail to the conduit.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Semi-Trailer

Figure 1:
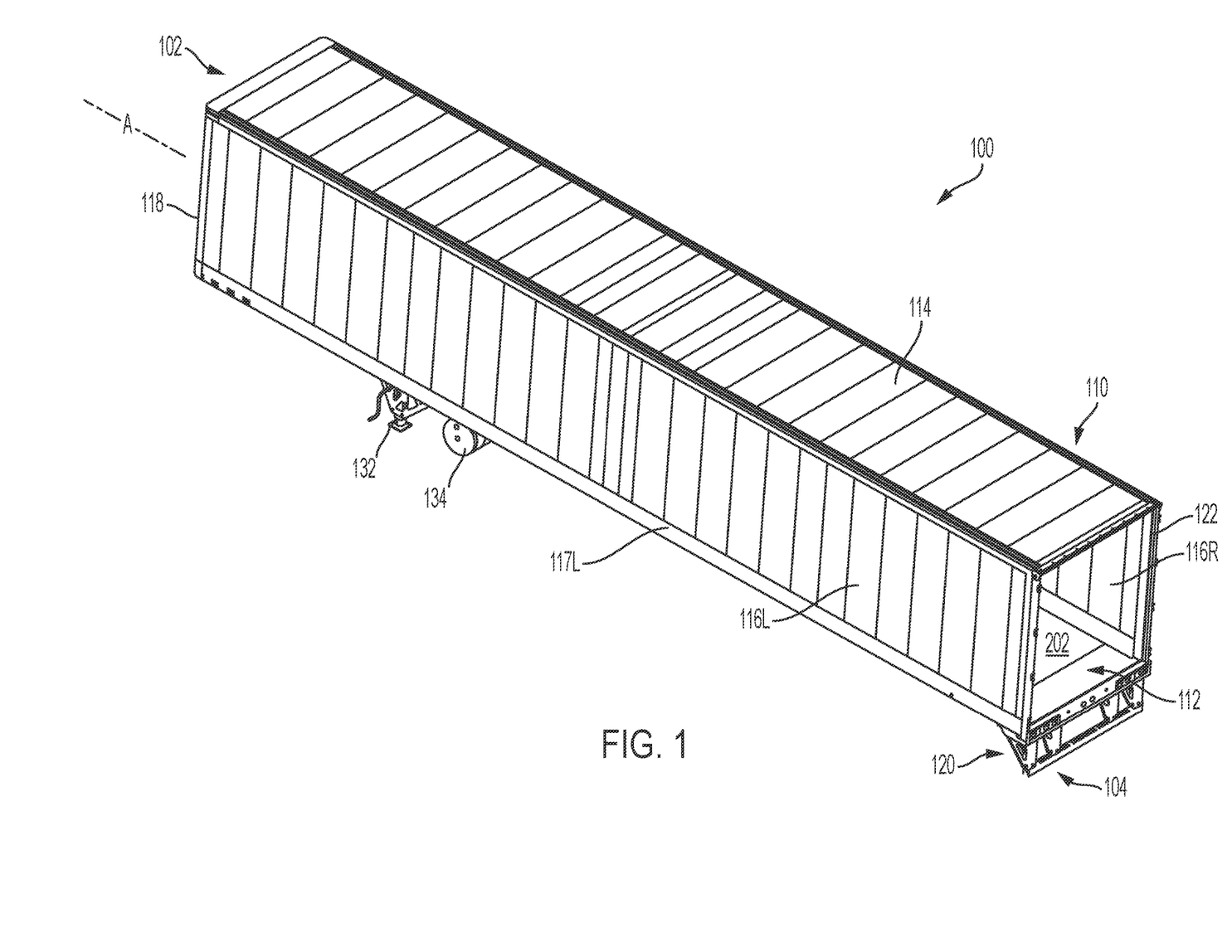
FIG. 1 is a top perspective view of an exemplary semi-trailer of the present disclosure including a composite floor assembly.

Referring initially to FIG. 1, a semi-trailer 100 is shown for supporting and transporting cargo. The illustrative trailer 100 extends along a longitudinal axis A from a front end 102 to a rear end 104. The illustrative trailer 100 includes a cargo body 110 with a floor assembly 112, a roof 114, a right sidewall 116R, a left sidewall 116L, a front wall or nose 118, and a rear door assembly 120 having a rear frame 122 and a door (not shown) to access the cargo body 110.

Moving from the front end 102 to the rear end 104, the trailer 100 also includes a coupler assembly 130 having a king pin 131 (see FIG. 3) configured to couple the cargo body 110 to a motorized tractor or another vehicle (not shown), a landing gear assembly 132 configured to support the cargo body 110 on the ground, a fuel tank assembly 134, and a slide rail assembly (not shown) configured to couple the cargo body 110 to a rear wheel assembly (not shown). The front end 102 of the cargo body 110 may be supported atop the tractor (not shown) via the coupler assembly 130 in a transport condition or atop the landing gear assembly 132 in a stationary condition, and the rear end 104 of the cargo body 110 may be supported atop the wheel assembly (not shown) in either the transport or the stationary condition.

In the illustrated embodiment of FIG. 1, cargo body 110 of trailer 100 is an enclosed body. The cargo body 110 may be refrigerated and/or insulated to transport temperature-sensitive cargo. While the concepts of this disclosure are described in relation to a refrigerated trailer 100, it will be understood that they are equally applicable to other vehicles generally, and more specifically to conventional trailers (e.g., dry freight trailers, flatbed trailers, commercial trailers, small personal trailers) and/or box or van semi-trailers, and the like. Accordingly, those skilled in the art will appreciate that the present invention may be implemented in a number of different applications and embodiments and is not specifically limited in its application to the particular embodiments depicted herein.

Trailer 100 may have various features in common with the vehicles shown and described in International Publication No. WO 2016/137974 and U.S. Patent Application Publication No. 2017/0240217, the disclosures of which are expressly incorporated herein by reference in their entirety.

2. Composite Materials

The cargo body 110 of trailer 100 may be constructed, at least in part, of composite materials. For example, the floor assembly 112, roof 114, right sidewall 116R, left sidewall 116L, and/or nose 118 of cargo body 110 may be constructed of composite materials. As such, the floor assembly 112, roof 114, right sidewall 116R, left sidewall 116L, and/or nose 118 of cargo body 110 may be referred to herein as composite structures.

Composite materials are generally formed by combining two or more different constituents that remain separate and distinct in the final composite material. Exemplary composite materials for use in the composite cargo body 110 include fiber-reinforced plastics (FRP), for example carbon-fiber-reinforced plastics (CRP). Each composite structure may be a single, unitary component, which may be formed from a plurality of constituents or layers permanently coupled together. Other elements of the cargo body 110 may be constructed of non-composite (e.g., metallic) materials. For example, the rear door assembly 120 of the cargo body 110 may be constructed of metallic materials.

The composite construction of the cargo body 110 may present certain advantages. First, because the composite structures may lack structural metallic components, the composite cargo body 110 may have a reduced heat loss coefficient (Ua) and improved thermal efficiency. Also, the composite cargo body 110 may operate to minimize outgassing of blowing agents, minimize air loss, and minimize water intrusion. Additionally, the composite cargo body 110 may be lighter in weight than a typical metallic cargo body, which may improve fuel efficiency. Further, the composite cargo body 110 may have fewer metallic structures than a typical cargo body, which may make the cargo body 110 less susceptible to corrosion. Also, the composite cargo body 110 may include fewer parts than a typical metallic cargo body, which may simplify construction, reduce inventory, and reduce variation in manufacturing. Further, the composite cargo body 110 may be suitable for use with sensitive cargo, including foodstuffs, because the composite materials may be inert to avoid reacting with the cargo and other materials and because the composite materials may be easy to clean and maintain to ensure proper hygiene. As a result, the composite cargo body 110 may qualify as "food grade" equipment.

The composite structures of the present disclosure may contain one or more structural supports or preforms. The preform may have a structural core that has been covered with an outer fabric layer or skin. The outer skin may be stitched or otherwise coupled to the underlying core and/or any surrounding layers. The core may be extruded, pultruded, or otherwise formed into a desired shape and cut to a desired length. In an exemplary embodiment, the core is a polyurethane foam material or another foam material, and the outer skin is a non-woven spun bond polyester material, a fiberglass fabric, or another suitable material. Advantageously, in addition to its structural effect, the foam core may have an insulating effect in certain applications, including refrigerated trucking applications. Exemplary preforms include PRISMA® preforms provided by Compsys, Inc. of Melbourne, Fla.

Both the core and the outer skin of the preform may be selected to accommodate the needs of the particular application. For example, in areas of the final structure requiring more strength and/or insulation, a low-density foam may be replaced with a high-density foam or a hard plastic block. The individual preforms may also be sized, shaped, and arranged in a manner that accommodates the needs of the particular application. For example, in areas of the final structure requiring less strength, the preforms may be relatively large in size, with the foam cores spanning relatively large distances before reaching the surrounding outer skins. By contrast, in areas of the final structure requiring more strength, the preforms may be relatively small in size, with the foam cores spanning relatively small distances before reaching the surrounding outer skins. Stated differently, the preforms may be shaped as relatively wide panels in areas of the final structure requiring less strength and as relatively narrow support beams in areas of the final structure requiring more strength.

The composite structures of the present disclosure may also contain one or more reinforcing materials or layers around the preforms. Each reinforcing layer may contain reinforcing fibers and may be capable of being impregnated and/or coated with a resin, as discussed further in Section 7 below. Suitable fibers include carbon fibers, glass fibers, cellulose, or polymers, for example. The fibers may be present in fabric form, which may be mat, woven, non-woven, or chopped, for example. Exemplary reinforcing layers include chopped fiber fabrics, such as chopped strand mats (CSM), and continuous fiber fabrics, such as 0°/90° fiberglass fabrics, +45°/−45° fiberglass fabrics, +60°/−60° fiberglass fabrics, 0° warp unidirectional fiberglass fabrics, and other stitched fiber fabrics, for example. Such fabrics are commercially available from Vectorply Corporation of Phenix City, Ala. Exemplary fabrics include the E-LM 1810 fiberglass fabric with 0° unidirectional fibers, the E-LTM 3610 fiberglass fabric with 0°/90° fibers, and the E-LTM 2408 fiberglass fabric with 0°/90° fibers, for example.

According to an exemplary embodiment of the present disclosure, a plurality of different reinforcing layers may be stacked together and used in combination. For example, a chopped fiber fabric (e.g., CSM) may be positioned adjacent to a continuous fiber fabric. In this stacked arrangement, the chopped fibers may help support and maintain the adjacent continuous fibers in place, especially around corners or other transitions. Also, the chopped fibers may serve as a web to resist column-type loads in compression, while the adjacent continuous fibers may resist flange-type loads in compression. Adjacent reinforcing layers may be stitched or otherwise coupled together to simplify manufacturing, to ensure proper placement, and to prevent shifting and/or bunching.

3. Composite Floor Assembly

Figure 2:
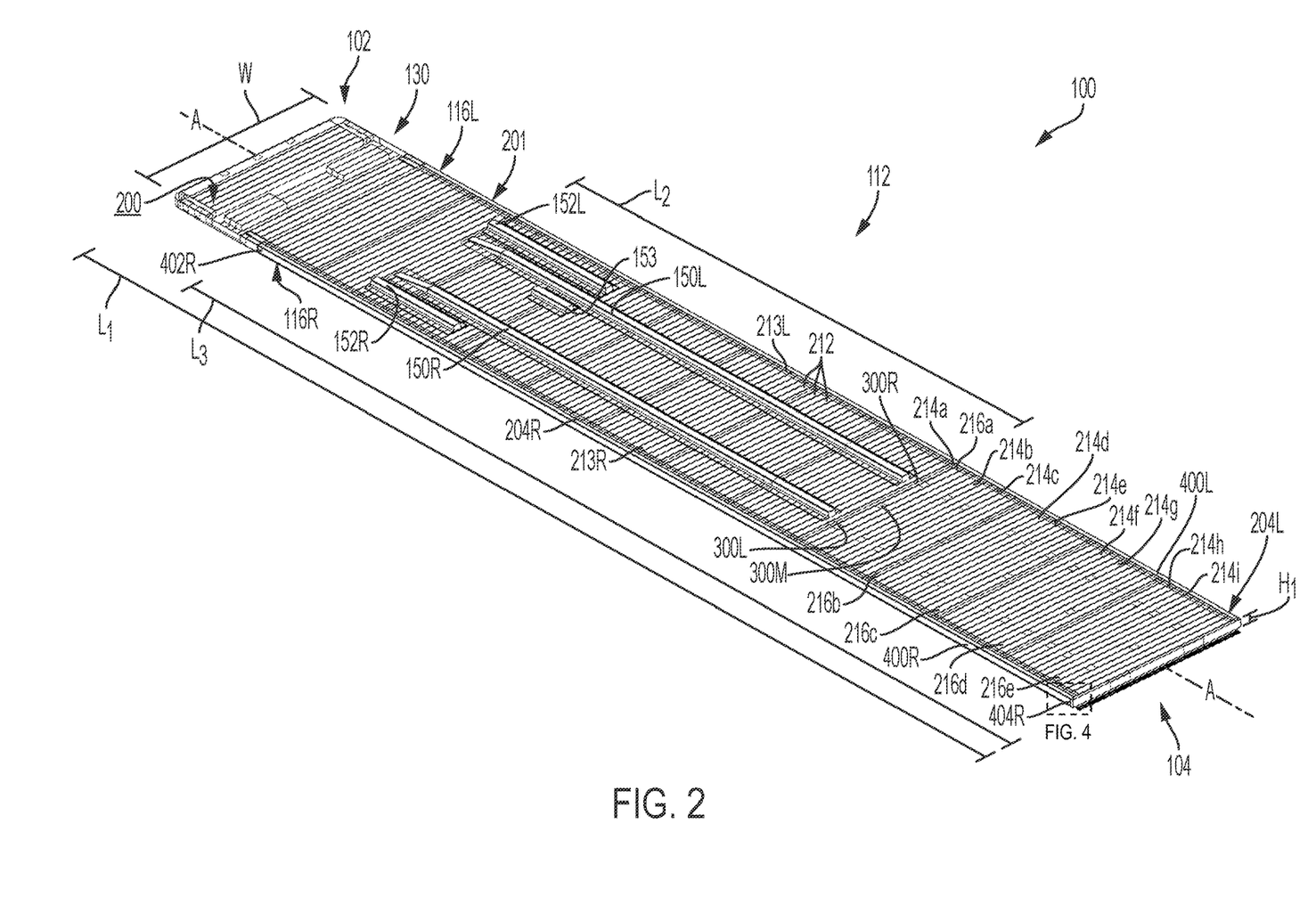
FIG. 2 is a bottom perspective view of the exemplary semi-trailer of FIG. 1, shown with a conduit coupled to the composite floor assembly.
Figure 3:
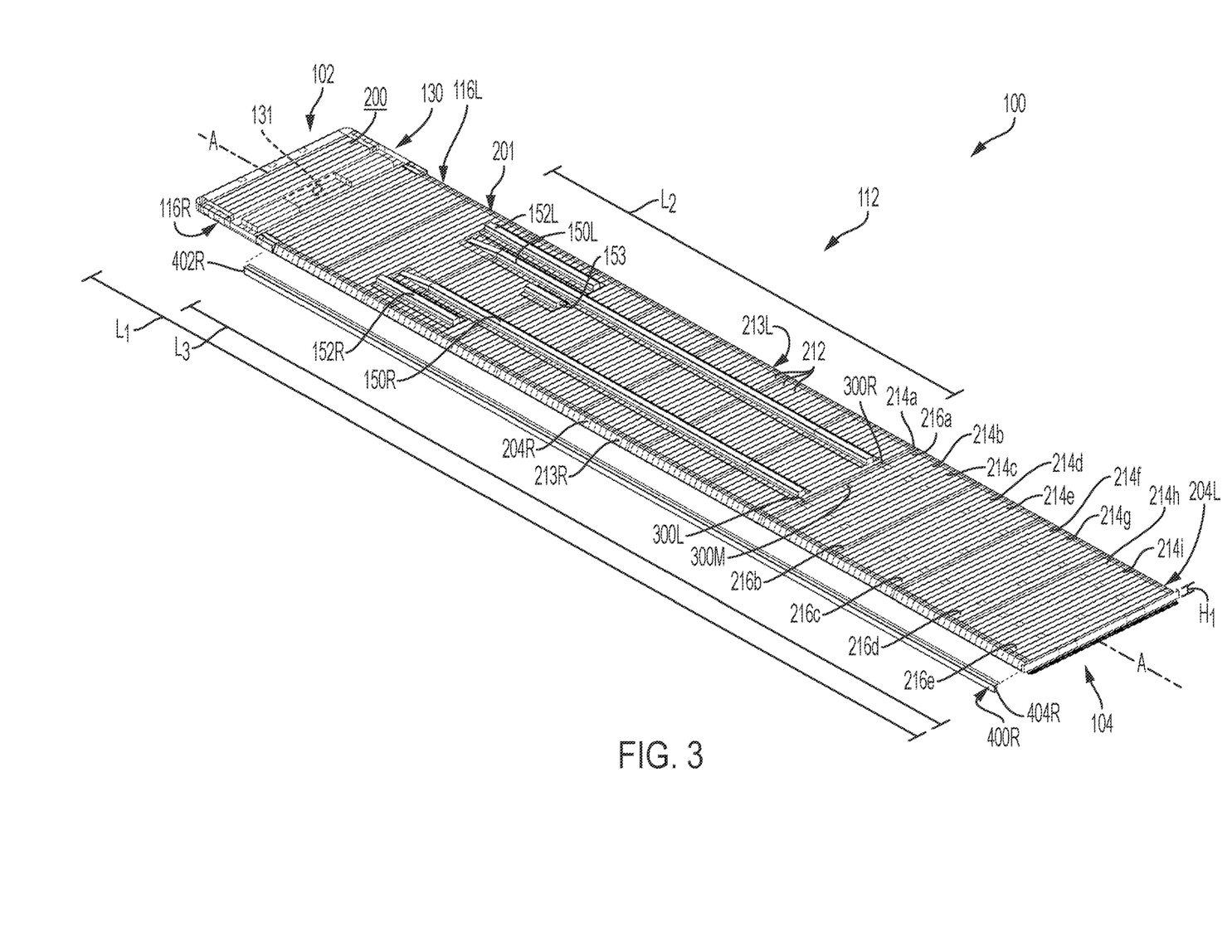
FIG. 3 is a partial perspective exploded view of the exemplary semi-trailer of FIG. 1, shown with the conduit coupled to the composite floor assembly.

Floor assembly 112 is shown in more detail in FIGS. 2 and 3. The illustrative floor assembly 112 includes a lower surface 200 that faces downward toward the ground when in use. The illustrative floor assembly 112 also includes an upper surface or platform 202 (see FIG. 1) that faces upward when in use to support cargo or other objects. The illustrative floor assembly 112 has a generally rectangular outer perimeter 201 with a width W, a length $L_1$, and a height $H_1$ between the lower surface 200 and the upper surface 202 (see FIG. 1), although this shape may vary. As discussed in Section 2 above and Section 7 below, floor assembly 112 may be a composite structure that is constructed, at least in part, of composite materials.

As further shown in FIGS. 2 and 3, the exemplary floor assembly 112 includes a plurality of transverse composite beams 212. Illustratively, each of the plurality of transverse composite beams 212 is oriented generally orthogonal to longitudinal axis A. More specifically, each of the plurality of transverse composite beams 212 extend in a direction perpendicular to longitudinal axis A with longitudinal ends 213R, 213L positioned along outer perimeter 201 of floor assembly 112 and adjacent to sidewalls 116R, 116L, respectively. The individual transverse composite beams 212 may be constructed in accordance with Section 2 above and Section 7 below. Specifically, each transverse composite beams 212 may be a preform of a structural core wrapped in an outer skin.

The plurality of transverse composite beams 212 includes a first subset of rearward beams 214, specifically rearward beams 214a-i, and a second subset of rearward beams 216, specifically rearward beams 216a-e. In the exemplary embodiment shown, some of the beams 214, 216 are longitudinally spaced apart from one another along longitudinal axis A. More specifically, some of the beams 214, 216 are intermixed with and separated by the remainder of the plurality of transverse composite beams 212 such that some of the beams 214, 216 are longitudinally spaced apart along a rear portion 113 of cargo body 110. Others of the beams 214, 216, specifically beams 214a, 216a, are positioned immediately adjacent to each other.

As discussed in Section 2 above, the individual transverse composite beams 212, 214, 216 may be sized, shaped, and arranged in a manner that accommodates the needs of the particular application. For example, a relatively large number of small, closely-spaced beams may be used for high-weight/high-strength applications, whereas a relatively small number of large and/or spaced-apart beams may be used for low-weight/low-strength applications.

4. Longitudinal Beams

As shown in FIGS. 2 and 3, cargo body 110 includes a first and second longitudinal main beam 150L, 150R extending downward from lower surface 200 of floor assembly 112 along a length $L_2$ of cargo body 110 parallel to longitudinal axis A and oriented generally orthogonal to the plurality of transverse composite beams 212, 214, 216. Longitudinal main beams 150L, 150R are illustratively positioned laterally inward of longitudinal ends 213R, 213L of the plurality of composite beams 212, 214, 216, which correspond to sidewalls 116R, 116L of cargo body 110 (see FIG. 1). In the exemplary embodiment shown, longitudinal main beams 150L, 150R are positioned laterally intermediate longitudinal axis A and the respective longitudinal end 213R, 213L. That said, the lateral position of longitudinal main beams 150L, 150R relative to longitudinal axis A and longitudinal ends 213R, 213L lateral sides of cargo body 110 may be adjusted depending on the specific application and components of cargo body 110. Furthermore, the individual longitudinal main beams 150L, 150R may be constructed in accordance with Section 2 above and Section 7 below. Specifically, each longitudinal main beam 150L, 150R may be a preform of a structural core wrapped in an outer skin.

Longitudinal beams 150L, 150R extend along length $L_2$ of floor assembly 112. As shown in FIG. 2, length $L_2$ is a portion of overall length $L_1$ of cargo body 110. More specifically, longitudinal main beams 150L, 150R extend along longitudinal axis A from proximate front end 102 of cargo body 110 to a slide rail assembly (not shown). In the exemplary embodiment shown, longitudinal main beams 150L, 150R extend longitudinally from proximate coupler assembly 130 and proximate landing gear assembly 132 without extending entirely to front end 102 of trailer 100 to approximate a rearward portion of trailer 100 where a slide rail assembly (not shown) couples to floor assembly 112 without extending entirely to rear end 104 of cargo body 110. An advantage, among others, of longitudinal main beams 150L, 150R is that longitudinal main beams 150L, 150R provide stiffness along length $L_2$ of floor assembly 112.

In the exemplary embodiment shown, cargo body 110 includes additional longitudinal beams 152L, 152R, 153. Longitudinal beams 152L, 152R, 153 extend along a shorter length of floor assembly 112 than length $L_2$ of longitudinal main beams 150L, 150R. More specifically, longitudinal beams 152L, 152R, 153 are positioned proximate front end 102 of cargo body 110 without extending entirely to coupler assembly 130 or rear end 104 of cargo body 110. In the exemplary embodiment shown, longitudinal beams 152L, 152R, 153 provide a coupling surface for components of cargo body 110 such as, for example, landing gear assembly 132 and fuel tank assembly 134 (see FIG. 1). Another advantage, among others, of longitudinal beams 152L, 152R, 153 is that longitudinal beams 152L, 152R, 153 provide additional stiffness to floor assembly 112 near front end 102 (i.e., the area of landing gear assembly 132 and fuel tank assembly 134).

Similar to the transverse composite beams 212, the individual longitudinal beams 150L, 150R, 152L, 152R, 153 may be sized, shaped, and arranged in a manner that accommodates the needs of the particular application. For example, in another embodiment, longitudinal beams 152L, 152R, 153 are sized and arranged to accommodate an additional fuel tank assembly or other accessory positioned, for example, laterally opposite fuel tank assembly 134.

5. Embedded Hardpoint Connectors

Floor assembly 112 may include one or more embedded hardpoint connectors 300, as shown in FIGS. 2 and 3. Connectors 300 may serve as fasteners or anchors for mechanically coupling other components of trailer 100 to floor assembly 112, such as rear door assembly 120 (FIG. 1), a coupler assembly 130, landing gear assembly 132 (FIG. 1), fuel tank assembly 134 (FIG. 1), a slide rail assembly (not shown), and/or a suspension assembly (not shown), for example.

Each connector 300 may be configured to receive one or more mechanical fasteners (not shown) from the adjacent component. Suitable mechanical fasteners include bolts, screws, rivets, and nails, for example. In certain embodiments, connectors 300 may include pre-tapped holes (not shown) capable of receiving the mechanical fasteners. Depending on the needs of the particular application, the mechanical fasteners may be used alone or in combination with structural adhesives. The mechanical fasteners may be desired when the adjacent component will be susceptible to peeling, whereas structural adhesive may be desired when the adjacent component will be susceptible to shear loads. When used alone, the mechanical fasteners may facilitate efficient and inexpensive assembly and repairs of trailer 100. When used in combination with structural adhesive, the mechanical fasteners may also serve as clamps to stabilize trailer 100 during curing of the structural adhesive.

In the exemplary embodiment of FIGS. 2 and 3, connectors 300 are illustratively embedded in a select group of beams of the plurality of transverse composite beams 212. More specifically, connectors 300 are embedded in beams 214, 216, which comprise a first and second subset of the plurality of beams 212. The remaining beams 212 may lack embedded connectors 300. In an alternative embodiment, some or all of the remaining beams 212 may include embedded connectors 300.

As referenced above, one or more beams 212 lacking embedded connectors 300 may be arranged between some of the beams 214, 216 having embedded connectors 300 such that some of the connectors 300 are longitudinally spaced apart along cargo body 110. Others of the beams 214, 216, specifically beams 214a, 216a, may be positioned immediately adjacent to each other, such that others of the embedded connectors 300 are longitudinally adjacent to each other.

Illustratively, connectors 300 comprise a generally planar body or plate and are embedded in lower surface 200 of composite floor assembly 112, more specifically within beams 214, 216 themselves. In an alternative embodiment, connectors 300 are embedded in another surface or span two or more surfaces of beams 214, 216. Accordingly, connectors 300 may also be C-shaped, T-shaped, pi-shaped, bent, tubular, or other suitable shapes. Connectors 300 may be embedded in beams 214, 216 during formation of the accordance with Section 7 below.

In the exemplary embodiment shown in FIG. 3, each beam 214, 216 includes a plurality of embedded connectors 300, illustratively between two and three embedded connectors 300. Generally, connectors 300 are spaced apart from one another along the longitudinal length of each beam 214, 216. For example, connectors 300 may be positioned intermediate longitudinal axis A and a respective longitudinal end 213L, 213R of beams 214, 216. More specifically, connectors 300 are positioned laterally inward of longitudinal ends 213L, 213R of beams 214, 216 (corresponding to the lateral sidewalls 116L, 116R of cargo body 110 (see FIG. 1)).

In the exemplary embodiment shown, beams 214 include connectors 300L, 300R and beams 216 include connectors 300L, 300M, 300R. Regarding beams 214, 216, connectors 300L, 300R are positioned laterally intermediate longitudinal axis A and a respective longitudinal end 213L, 213R of beams 214, 216. Regarding beams 216, connectors 300M are positioned laterally intermediate connectors 300L, 300R. More specifically, connectors 300M are positioned along longitudinal axis A when beams 216 are arranged as part of floor assembly 112. That said, the position and number of connectors 300 along the length of each beam 214, 216 may be adjusted for the required application. Moreover, the subsets of beams 214, 216 with embedded connectors 300 may be more or fewer than the number of selected beams 214, 216 shown in FIG. 3.

Connectors 300 may be constructed of metallic materials (e.g., steel, aluminum, titanium), polymeric materials, wood, or composite materials. In certain embodiments, connectors 300 are constructed of materials which are dissimilar from the composite material used to construct the corresponding beams. Connectors 300 may be fabricated by extrusion, pultrusion, sheet forming, roll forming, and/or casting, for example. Connectors 300 may also be single-piece or multi-piece constructs. For multi-piece constructs, the pieces may be welded, mechanically fastened, adhered, snap-fit, or otherwise coupled together.

6. Conduits

Floor assembly 112 may include one or more conduits 400, as shown in FIGS. 2 and 3. Conduits 400 may serve to internally route vehicle components, such as air hoses H and/or electrical cables C, along a length of composite floor assembly 112. Conduits 400 may also serve to route fuel lines (not shown) along a length of composite floor assembly 112, but such fuel lines would be separated from any electrical cables C.

In the exemplary embodiment shown in FIG. 2, floor assembly 112 includes conduits 400L, 400R positioned laterally opposite from one another. More specifically, conduit 400L is coupled to the left-side perimeter 201 of floor assembly 112 along longitudinal ends 213L of beams 212, which generally correspond to sidewall 116L of trailer 100. Similarly, conduit 400R is coupled to the right-side perimeter 201 of floor assembly 112 along longitudinal ends 213R of beams 212, which generally correspond to sidewall 116R of trailer 100. In another embodiment, floor assembly 112 includes a single conduit 400, which could be coupled to either of longitudinal ends 213L, 213R.

Conduits 400L, 400R illustratively extend along a length $L_3$ of floor assembly 112 parallel to and spaced apart from longitudinal axis A. In the exemplary embodiment shown, length $L_3$ is less than length $L_1$ of floor assembly 112. More specifically, conduits 400L, 400R extend from proximate coupler assembly 130 at front end 102 of trailer 100 to proximate rear end 104 of trailer 100. Furthermore, length $L_3$ is longer than length $L_2$ of main longitudinal beams 150L, 150R. In an alternative embodiment, conduits 400L, 400R (or a single conduit 400) may extend from proximate front end 102 to proximate rear end 104 of trailer 100 or extend along a length of floor assembly 112 shorter or longer than length $L_3$ of conduits 400L, 400R of FIGS. 2 and 3.

Figure 4:
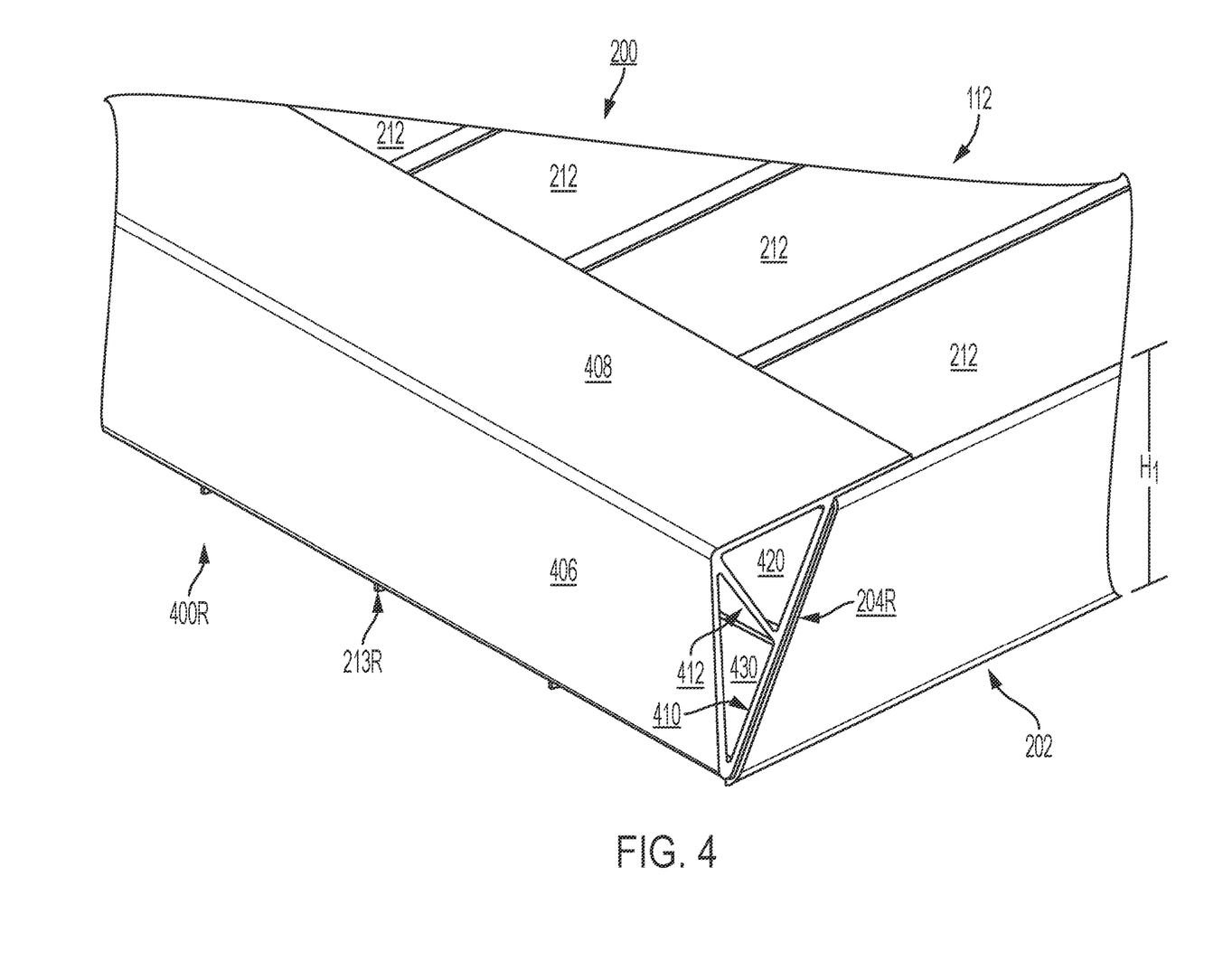
FIG. 4 is a detail view of the conduit coupled to the composite floor assembly of FIG. 2.
Figure 5:
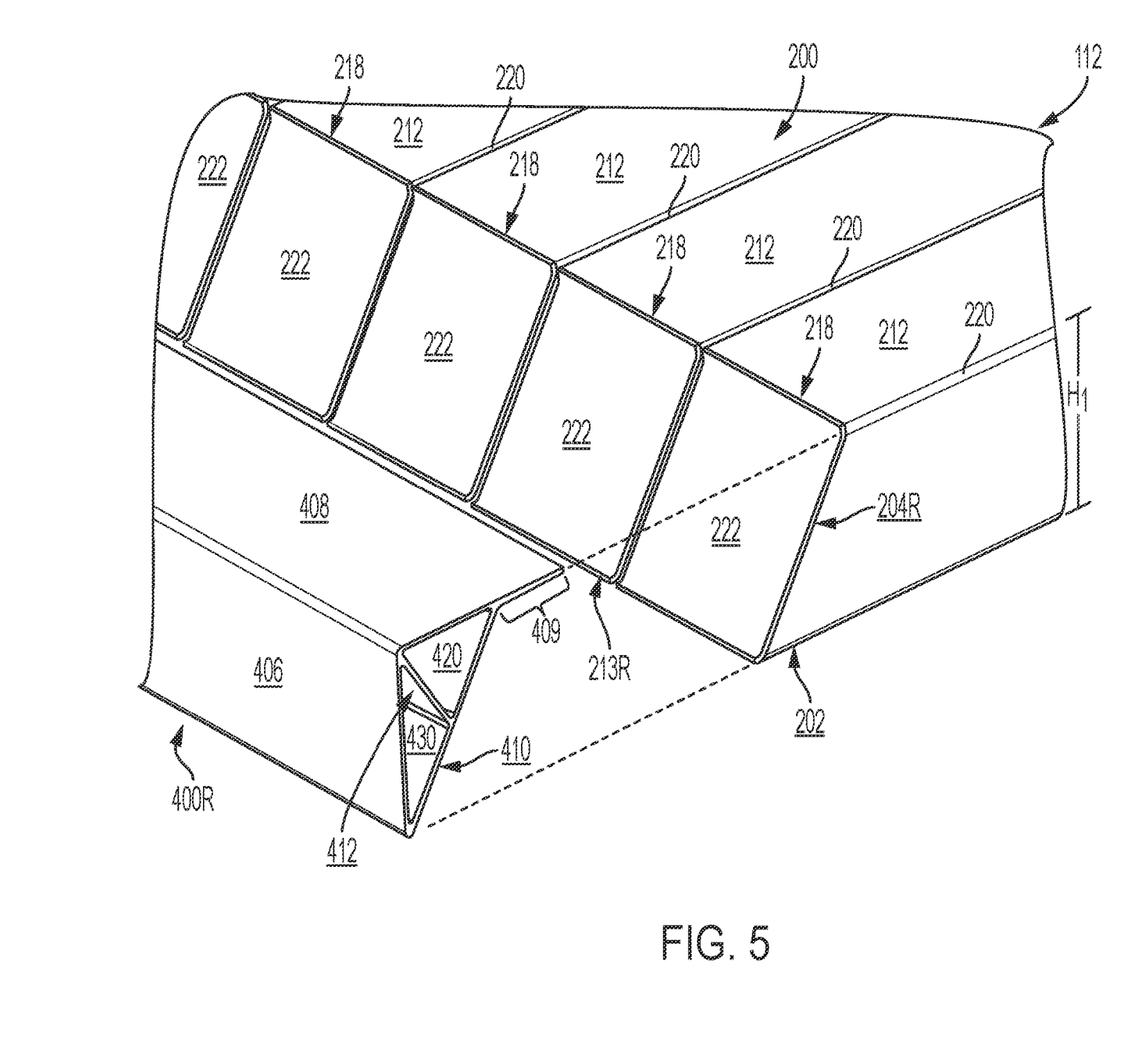
FIG. 5 is a detail exploded view of the conduit coupled to the composite floor assembly of FIG. 2.
Figure 6:
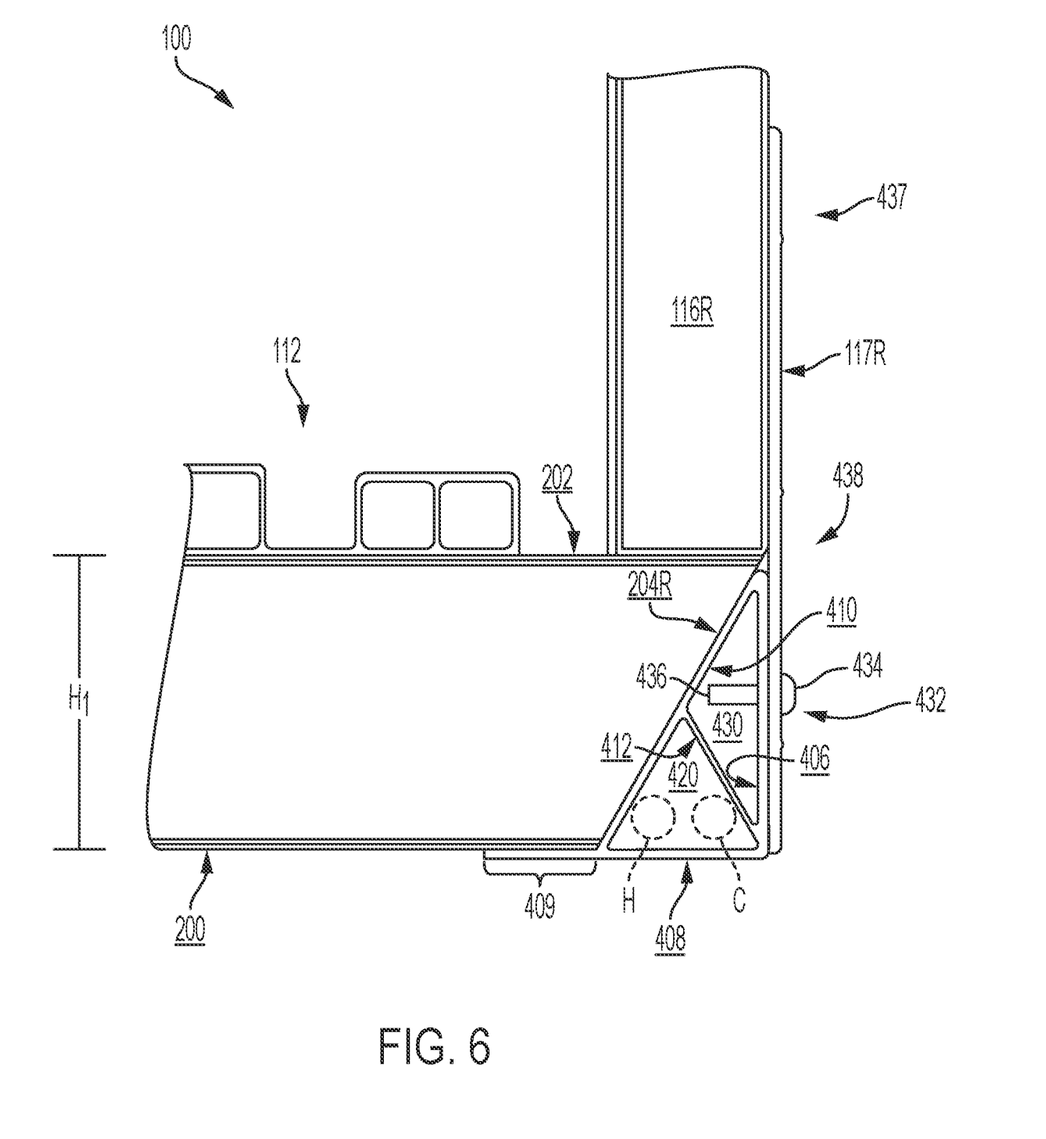
FIG. 6 is a partial cross-sectional view of the exemplary semi-trailer of FIG. 1, shown with the conduit coupled to the composite floor assembly and a base rail coupling a sidewall to the conduit.

Turning now to FIGS. 4 through 7, a detailed view of conduit 400R is shown. In FIGS. 4 through 6, conduit 400R is shown coupled to floor assembly 112. Conduit 400R includes a first internal cavity 420 and a second internal cavity 430 extending along a length of conduit 400R generally parallel to longitudinal axis A. Illustratively, internal cavities 420, 430 extend from a first longitudinal end 402R of conduit 400R to a second longitudinal end 404R spaced apart from first longitudinal end 402R along length $L_3$ of conduit 400R (see FIG. 2). Therefore, in the exemplary embodiment shown, internal cavities 420, 430 extend longitudinally along length $L_3$ of conduit 400R. In an alternative embodiment, internal cavities 420, 430 may extend along a portion of length $L_3$. For example, internal cavities 420, 430 may extend from first longitudinal end 402R to a longitudinal location along conduit 400R intermediate longitudinal ends 402R, 404R. Conduit 400L may be coupled to floor assembly 112 in a similar manner and include the same or similar internal cavities as conduit 400R.

Figure 7:
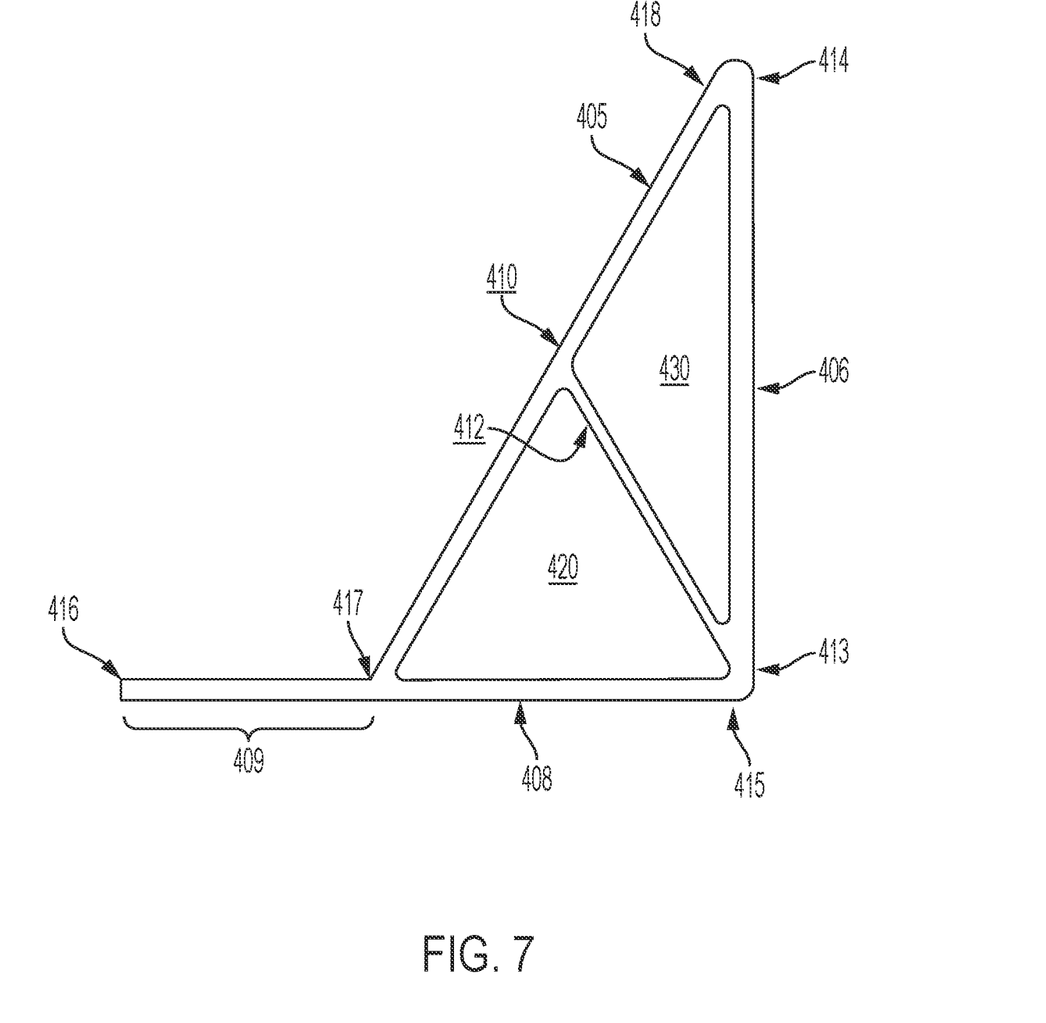
FIG. 7 is a cross-sectional view of the conduit of FIG. 4.

Turning to FIG. 7, conduit 400R has a prismatic shape with a constant and geometric transverse cross-sectional area along its length. More specifically, conduit 400R includes an exterior boundary 405 defined by a first vertical wall 406, a second horizontal wall 408, and a third oblique wall 410. In the exemplary embodiment shown, third wall 410 intersects first and second walls 406, 408 to form a conduit having a generally triangular transverse cross-sectional area. More specifically, a first end 415 of second wall 408 intersects a first end 413 of first wall 406, and a first end 417 of third wall 410 intersects second wall 408 intermediate the first end 415 and a second end 416 of second wall 408. As a result, a portion 409 of second wall 408, including second end 416, extends past where first end 417 of third wall 410 intersects second wall 408. In addition, a second end 418 of third wall 410 intersects a second end 414 of first wall 406. Illustratively, second wall 408 perpendicularly intersects first wall 406, and third wall 410 obliquely intersects first and second walls 406, 408. In an alternative embodiment, second wall 408 may intersect first wall 406 and third wall 410 may intersect first and second walls 406, 408 at different angles than those shown in the exemplary embodiment.

Conduit 400R further includes a midwall 412 confined within exterior boundary 405 and coupled to at least one of walls 406, 408, 410. In the exemplary embodiment shown, midwall 412 is coupled to third wall 410 and extends from an intersection between walls 406, 408. More specifically, midwall 412 is coupled to an approximate mid-point of third wall 410 between ends 417, 418 and extends from the intersection of first end 413 of first wall 406 with first end 415 of second wall 408. Midwall 412 cooperates with exterior boundary 405 to define internal cavities 420, 430. Specifically, midwall 412, a portion of second wall 408, and a portion of third wall 410 define internal cavity 420. In an alternative embodiment, internal cavity 420 may be defined by midwall 412, the entirety of second wall 408, and a portion of third wall 410. In addition, internal cavity 430 is defined by midwall 412, first wall 406, and a portion of third wall 410. In an alternative embodiment, conduit 400R may include more or fewer internal cavities. Moreover, it is contemplated that the size, shape, and number of internal cavities may be adjusted based on, for example, the intended application of conduits 400L, 400R.

Internal cavity 420 is configured to route at least one vehicle component, such as, for example, an air hose H and/or an electrical cable C. Therefore, internal cavity 420 is sized and shaped to receive at least one vehicle component for routing along a length of conduit 400. In one example, internal cavity 420 routes an electrical cable C to supply power from the tractor (not shown) at front end 102 to rear end 104 of trailer 100 (FIG. 1). In a further embodiment, internal cavity 420 routes anti-locking braking system ("ABS") control wires for trailer air brakes. In another example, internal cavity routes an air hose H to supply pressure to trailer air brakes from a front end 102 of trailer 100 (FIG. 1). An advantage, among others, of routing at least one vehicle component through internal cavity 420 is that the at least one vehicle component can be more easily replaced or maintained relative to molding the vehicle component into floor assembly 112.

Illustratively, conduits 400L, 400R route a plurality of vehicle components to various longitudinal locations along length $L_3$ of trailer 100, including the first longitudinal end 402R of each conduit 400L, 400R, the second longitudinal end 404R of each conduit 400L, 400R, and intermediate locations therebetween. For example, a fuel line routed through one of internal cavities 420, 430 to a refrigeration unit location proximate front end 102 of trailer 100 may enter conduits 400L, 400R proximate fuel tank assembly 134. In another example, an electrical wire C for a mid-trailer marker light, which may be mounted vertically below base rails 117L, 117R, may exit conduits 400L, 400R proximate a mid-length of trailer 100. In a further example, the air hose H and the ABS control wires may exit conduits 400L, 400R longitudinally forward of the slide rail assembly (not shown). In yet another example, an electrical wire C for a rear light of trailer 100 may be routed through conduits 400L, 400R to proximate rear end 104 of trailer 100.

In order to accommodate the routing of the plurality of vehicle components, second wall 408 or another suitable surface of each conduit 400L, 400R may include a plurality of apertures (not shown) longitudinally spaced along length $L_3$ of conduits 400L, 400R. The plurality of apertures in second wall 408 may be sized and shaped to permit at least one of the plurality of vehicle components to pass through, thereby entering or exiting the conduit 400L, 400R at the desired longitudinal location, either directly or via a coupler. It is contemplated that conduits 400L, 400R may include extra apertures that are not used (i.e., that remain empty or are sealed or plugged) for a particular application. For example, second wall 408 may include an aperture proximate fuel tank assembly 134 that is not used when conduits 400L, 400R are not used to route fuel lines.

Internal cavity 430 is configured to receive a plurality of mechanical fasteners 432 (see FIG. 6), such as, for example, bolts, screws, or rivets. Illustratively, mechanical fasteners 432 are inserted into first wall 406 such that mechanical fasteners 432 extend into internal cavity 430 without extending into internal cavity 420. Therefore, in one embodiment, first wall 406 may include a plurality of apertures (not shown) sized and shaped to receive a corresponding one of the plurality of mechanical fasteners 432. An advantage, among others, of midwall 412 is that midwall 412 protects the at least one vehicle component routed through internal cavity 420 from mechanical fasteners 432 inserted through first wall 406 into internal cavity 430. The coupling of mechanical fasteners 432 to conduit 400 is described further below.

Figure 10:
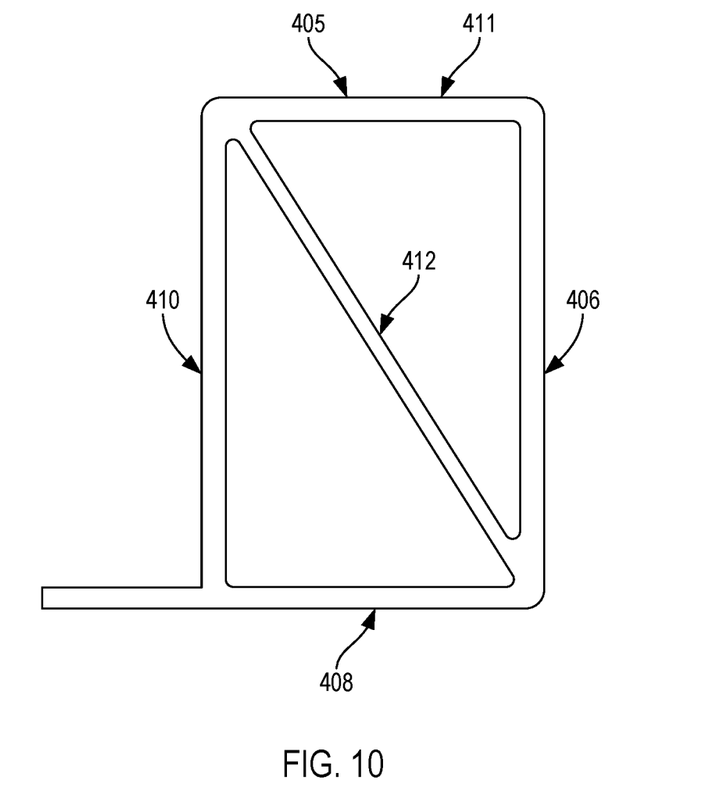
FIG. 10 is a cross-sectional view of a conduit of the present disclosure.

In the exemplary embodiment shown in FIGS. 4-7, conduit 400R comprises a triangular transverse cross-sectional area. Other transverse cross-sectional areas, however, are contemplated. For example and as shown in FIG. 10, the transverse cross-sectional area may be a square or rectangular transverse cross-sectional area. More specifically, exterior boundary 405 may be defined by more than three walls. For example, exterior boundary 405 may be further defined by a fourth wall 411. Fourth wall 411 may intersect first wall 406 and third wall 410 to form a conduit having a square or rectangular transverse cross-sectional area. That is, second wall 408 may perpendicularly intersect first wall 406, third wall 410 may perpendicularly intersect second wall 408, and fourth wall 411 may perpendicularly intersect first wall 406 and third wall 410. In a further alternative embodiment and as shown in FIG. 10, midwall 412 is coupled to first wall 406 and fourth wall 411. At least one of walls 406, 408, 410 and 411 may be coupled to floor assembly 112.

Referring back to FIGS. 4 and 5, longitudinal ends 213R of floor assembly 112 cooperate to define a first or right side 204R of floor assembly 112. In the exemplary embodiment shown, first side 204R is angled with respect to lower surface 200 and upper surface 202 of floor assembly 112. More specifically, upper surface 202 extends laterally farther from longitudinal axis A than lower surface 200. Third wall 410 of conduit 400R comprises a complementary shape to first side 204R. That is, third wall 410 comprises a complementary angle to the angle of first side 204R in order to create a mating surface with first side 204R. In addition, portion 409 of second wall 408 extends underneath and supports a portion of lower surface 200 of floor assembly 112. An advantage, among others, of third wall 410 comprising a complementary angle to the angle of first side 204R is a more robust attachment of conduit 400R to floor assembly 112. This more robust attachment is due, at least in part, to the increase in contact area of third wall 410 and first side 204R when third wall 410 and first side 204R are angled relative to lower surface 200 and upper surface 202. Longitudinal ends 213L of floor assembly 112 may likewise define a second or left side 204L (FIG. 2) of floor assembly 112 comprising a complementary shape to that of conduit 400L.

Turning now to FIG. 6, conduit 400R is shown coupled to sidewall 116R. More specifically, cargo body 110 further includes a first base rail 117R extending along a length of cargo body 110 parallel to and spaced apart from longitudinal axis A. Illustratively, first base rail 117R extends from proximate front end 102 to proximate rear end 104 of trailer 100. First base rail 117R may comprise, for example, a metallic material or a composite material. An upper portion 437 of first base rail 117R is coupled to sidewall 116R. In the exemplary embodiment shown, upper portion 437 of first base rail 117R is adhered to sidewall 116R using, for example, a structural adhesive. In an alternative embodiment, upper portion 437 may be coupled to sidewall 116R using, for example, a plurality of mechanical fasteners or a combination of structural adhesive and mechanical fasteners. A lower portion 438 of first base rail 117R is coupled to conduit 400R. In the exemplary embodiment shown, lower portion 438 is coupled to conduit 400R using the plurality of mechanical fasteners 432. Mechanical fasteners 432 illustratively include a head end 434 positioned laterally outside of first base rail 117R and a terminal end 436 positioned laterally outside of midwall 412. In this way, terminal end 436 is positioned within internal cavity 430 and is isolated from internal cavity 420 by midwall 412. In an alternative embodiment, lower portion 438 of first base rail 117R may be adhered to conduit 400R using, for example, a structural adhesive or a combination of structural adhesive and mechanical fasteners. As shown in FIG. 6, conduit 400R is aligned beneath sidewall 116R, such that conduit 400R and floor assembly 112 are located within the profile of sidewall 116R and base rail 117R is located slightly outside the profile of sidewall 116R.

In a further alternative embodiment, first base rail 117R may be integrally formed with conduit 400R. In this way, first base rail 117R and conduit 400R may form a unitary body. When either first base rail 117R is integrally formed with conduit 400R or only a structural adhesive is used to couple first base rail 117R to conduit 400R, mechanical fasteners 432 may not be needed. As a result, internal cavity 430 may be configured to route one or more vehicle components separately from the one or more vehicle components routed through internal cavity 420. For example, internal cavity 430 may be configured to route a fuel line from proximate fuel tank assembly 134 to a refrigeration unit proximate front end 102 of trailer 100. In this way, the fuel line may be kept separate from any vehicle components routed through internal cavity 420. In an alternative embodiment, one or more vehicle component may be routed through internal cavities 420, 430 of conduit 400R while one or more different vehicle components may be routed through the internal cavity or cavities of conduit 400L.

Cargo body 110 may further include a second base rail 117L (FIG. 1) extending along a length of cargo body 110 parallel to and spaced apart from longitudinal axis A. Illustratively, the second base rail 117L extends from proximate front end 102 to proximate rear end 104 of trailer 100. Similar to first base rail 117R, the second base rail 117L may comprise a metallic or composite material. In addition, an upper portion of the second base rail 117L may be adhered to sidewall 116L using, for example, a structural adhesive. In an alternative embodiment, the upper portion of the second base rail 117L may be coupled to sidewall 116L using, for example, a plurality of mechanical fasteners or a combination of mechanical fasteners and structural adhesive. A lower portion of the second base rail 117L may be coupled to conduit 400L using, for example, a plurality of mechanical fasteners. In an alternative embodiment, the lower portion of the second base rail 117L may be coupled to conduit 400L using, for example, a structural adhesive or a combination of structural adhesive and mechanical fasteners. An advantage, among others, of conduits 400L, 400R is that conduits 400L, 400R provide additional stiffness and strength to base rails 117L, 117R along a common length of base rails 117L, 117R and conduits 400L, 400R, respectively. For example, conduits 400L, 400R provide stiffness and strength along length $L_3$ of base rails 117L, 117R, respectively.

In the exemplary embodiment shown, conduits 400L, 400R are adhered to floor assembly 112 using, for example, a structural adhesive. The adhesive may be placed along portion 409 of second wall 408 for adhesion to lower surface 200 of floor assembly 112 and/or along third wall 410 for adhesion to longitudinal ends 213L, 213R of floor assembly 112. An advantage, among others, of coupling conduits 400L, 400R to longitudinal ends 213L, 213R of floor assembly 112 is that conduits 400L, 400R may protect longitudinal ends 213L, 213R during handling of floor assembly 112 and the coupling of sidewalls 116L, 116R to floor assembly 112. Another advantage, among others, of coupling conduits 400L, 400R to longitudinal ends 213L, 213R of floor assembly 112 is that conduits 400L, 400R help square floor assembly 112. More specifically, conduits 400L, 400R help keep transverse composite beams 212, 214, 216 straight and flat relative to one another and help keep sidewalls 116L, 116R generally perpendicular to floor assembly 112. In an alternative embodiment, conduits 400L, 400R may be coupled to longitudinal ends 213L, 213R using a plurality of mechanical fasteners, such as, for example, bolts, screws, or rivets, or using a combination of structural adhesive and mechanical fasteners. In a further embodiment, conduits 400L, 400R may be coupled to lower surface 200 or upper surface 202 of floor assembly 112. Furthermore, conduits 400L, 400R may be coupled to different surfaces of floor assembly 112 relative to one another. In a further alternative embodiment, conduits 400L, 400R are molded into floor assembly 112 during construction of floor assembly 112 in accordance with Section 2 above and Section 7 below.

7. Composite Molding Process

Figure 8:
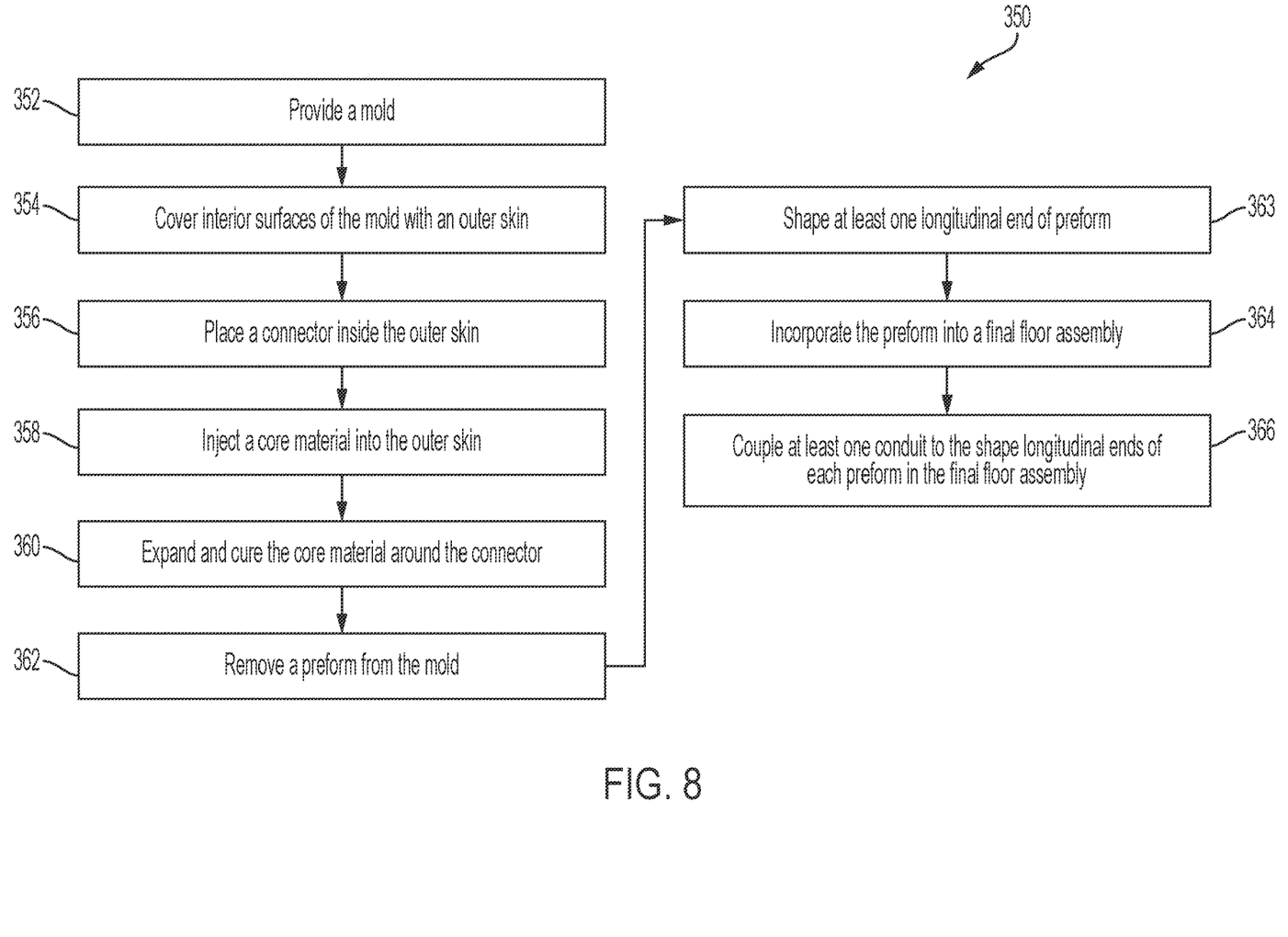
FIG. 8 is a flow chart of exemplary method for manufacturing the composite floor assembly of FIG. 1.
Figure 9:
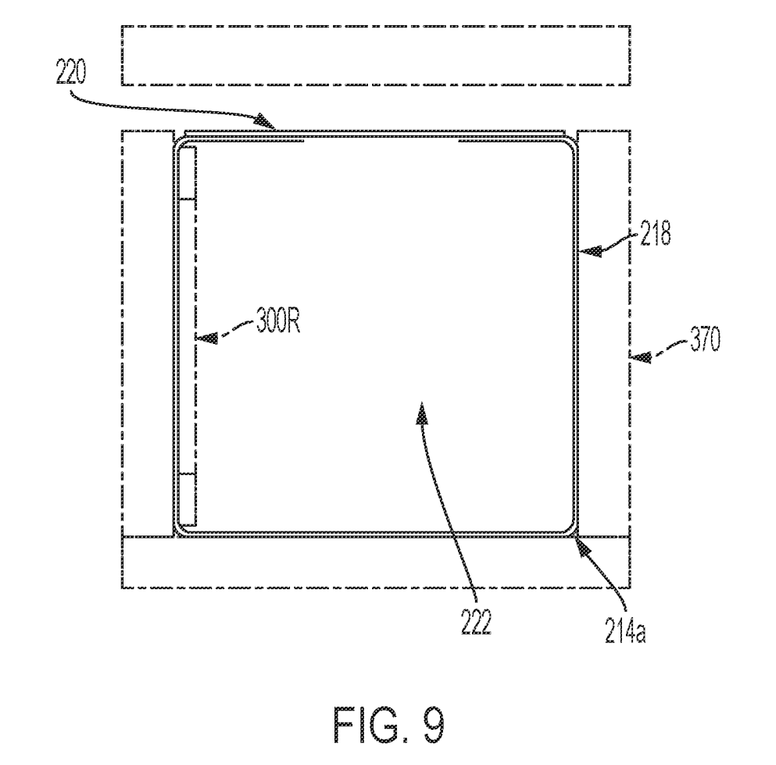
FIG. 9 is a cross-sectional view of one of a plurality of transverse composite beams of the composite floor assembly of FIG. 2.

Turning now to FIGS. 8 and 9, the composite structures of the present disclosure may be formed by a molding process 350, as discussed further below.

The illustrative method 350 involves fabricating each transverse beam 212, 214a-i, 216a-e as a preform and then incorporating the preforms into the final floor assembly 112. At step 352, a mold 370 having a desired shape is provided. At step 354, interior surfaces of mold 370 are covered with outer skins 218, 220. Outer skins 218, 220 may comprise a fiberglass fabric, for example. Moreover, outer skins 218, 220 may be of the same or different fabric weight. For example, outer skin 220 may be of a heavier fabric weight than outer skin 218. At step 356, any desired connectors 300 are placed inside outer skins 218, 220 in mold 370. With respect to the illustrative beam 214a of FIGS. 2 and 3, for example, connectors 300L (not shown in FIG. 9), 300R are spaced apart from one another along the intended longitudinal length of beam 214a within mold 370. Step 356 may be omitted when forming a transverse beam 212 that lacks connectors 300. At step 358, expandable core material 222 is injected or otherwise introduced into the outer skins 218, 220 to contact connectors 300, if present. At step 360, the core material 222 expands and cures within the outer skins 218, 220 and around connectors 300, if present, which holds connectors 300 in place. At step 362, a preform resembling the desired beam 212, 214a-i, 216a-e is removed from mold 370. At step 363, longitudinal ends 213R, 213L of each transverse beam 212, 214a-i, 216a-e may be cut or otherwise shaped to compliment conduits 400R, 400L. Step 363 may be omitted when longitudinal ends 213R, 213L are formed in the complimentary shape during the prior molding steps 352-362. At step 364, the preform is incorporated into the final floor assembly 112, which may involve arranging the preform with other preforms (e.g., beam 214a of FIG. 9 may be arranged with other beams 212, 214a-i, 216b-e) and reinforcing layers, wetting the materials with at least one resin and a catalyst to impregnate and/or coat the materials, and curing the materials to form the final floor assembly 112. At step 366, conduits 400R, 400L are adhered or otherwise coupled to longitudinal ends 213R, 213L of transverse beams 212, 214a-i, 216a-e.

The resin used to construct the composite structure may be a typical thermoset resin, a co-cure resin containing a plurality of individual co-curing resins which may be selectively distributed throughout the composite structure during the molding process, or a combination thereof. Such co-cure resins may comprise one or more elastomer components, such as urethane, co-cured with one or more resin components, such as a vinyl ester, epoxy, or unsaturated polyester components. Exemplary co-cure resins are disclosed in U.S. Pat. No. 9,371,468 and U.S. Publication No. 2016/0263873, the disclosures of which are hereby incorporated by reference in their entirety. As used herein, "co-cured" refers to the reactions involved in curing the elastomer components take place essentially concurrently with the reactions involved in curing the one or more resin components. In certain embodiments, areas of the composite structure that will be susceptible to high stress may receive a resin with a relatively higher polyurethane content for strength, whereas other areas of the composite structure that provide bulk and section modulus may receive a lower cost rigid, polyester-based resin, such as an isophthalic polyester resin.

Additional information regarding the construction of composite structures is disclosed in the following patents and published patent applications, each of which is incorporated by reference in its entirety herein: U.S. Pat. Nos. 5,429,066, 5,664,518, 5,800,749, 5,830,308, 5,897,818, 5,908,591, 6,004,492, 6,013,213, 6,206,669, 6,496,190, 6,497,190, 6,543,469, 6,723,273, 6,755,998, 6,869,561, 6,911,252, and 8,474,871, and U.S. Publication No. 2014/0262011.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A cargo body, comprising:
   a composite floor assembly having a first longitudinal end and a second longitudinal end spaced apart from the first longitudinal end along a floor longitudinal axis;
   a first composite side wall extending in a direction parallel to the longitudinal axis;
   a first conduit supported between the composite floor assembly and the first composite side wall; and
   a base rail having an upper portion coupled to the first composite side wall and a lower portion coupled to the first conduit via a plurality of mechanical fasters that extend into the first conduit.

2. The cargo body of claim 1, wherein the first conduit comprises at least three sides.

3. The cargo body of claim 1, wherein the first conduit comprises a first wall, a second wall, a third wall, and a fourth wall, wherein the second wall perpendicularly intersects the first wall, the third wall perpendicularly intersects the second wall, and the fourth wall perpendicularly intersects the third wall.

4. The cargo body of claim 1, wherein the first conduit comprises a first cavity and a second cavity that are at least partially vertically aligned.

5. The cargo body of claim 4, further comprising a base rail having an upper portion coupled to the first composite side wall and a lower portion coupled to the first conduit with a plurality of mechanical fasters that extend into the second cavity without extending into the first cavity.

6. The cargo body of claim 1, further comprising a reinforcing member coupled to the first conduit.

7. The cargo body of claim 1, further comprising a base rail having an upper portion coupled to the first composite side wall and a lower portion coupled to the first conduit.

8. The cargo body of claim 7, wherein the composite floor assembly comprises a surface in contact with the first conduit and angled relative to the base rail.

9. The cargo body of claim 1, further comprising:
a second composite side wall extending in a direction parallel to the longitudinal axis;
a second conduit supported between the composite floor assembly and the second composite side wall.

10. A cargo body, comprising:
a composite floor assembly having a first longitudinal end and a second longitudinal end spaced apart from the first longitudinal end along a floor longitudinal axis;
a composite side wall extending in a direction parallel to the longitudinal axis;
a conduit coupled to the composite floor assembly and the composite side wall, the conduit comprising a first cavity and a second cavity that are both intersected by a vertically extending axis; and
a base rail having an upper portion coupled to the composite side wall and a lower portion coupled to the conduit, wherein the lower portion of the base rail couples to the conduit with a plurality of mechanical fasters that extend into the second cavity without extending into the first cavity.

11. The cargo body of claim 10, wherein the conduit comprises at least three sides.

12. The cargo body of claim 10, wherein the conduit comprises a first wall, a second wall, a third wall, and a fourth wall, wherein the second wall perpendicularly intersects the first wall, the third wall perpendicularly intersects the second wall, and the fourth wall perpendicularly intersects the third wall.

13. The cargo body of claim 10, wherein the composite floor assembly comprises a surface in contact with the conduit and angled relative to the base rail.

14. The cargo body of claim 10, further comprising a reinforcing member coupled to the conduit.

15. A cargo body, comprising:
a composite floor assembly having a first longitudinal end and a second longitudinal end spaced apart from the first longitudinal end along a floor longitudinal axis;
a composite side wall extending in a direction parallel to the longitudinal axis;
a conduit coupled to the composite floor assembly and the composite side wall; and
a base rail having an upper portion coupled to the composite side wall and a lower portion coupled to the conduit via fasteners extending into the conduit.

16. The cargo body of claim 15, wherein the conduit comprises at least three sides.

17. The cargo body of claim 15, wherein the conduit comprises a first wall, a second wall, a third wall, and a fourth wall, wherein the second wall perpendicularly intersects the first wall, the third wall perpendicularly intersects the second wall, and the fourth wall perpendicularly intersects the third wall.

18. The cargo body of claim 15, wherein the composite floor assembly comprises a surface in contact with the conduit and angled relative to the base rail.

19. A cargo body, comprising:
a composite floor assembly having a first longitudinal end and a second longitudinal end spaced apart from the first longitudinal end along a floor longitudinal axis;
a composite side wall extending in a direction parallel to the longitudinal axis;
a conduit coupled to the composite floor assembly and the composite side wall, the conduit comprising a first cavity and a second cavity that are both intersected by a vertically extending axis; and
a base rail having an upper portion coupled to the composite side wall and a lower portion coupled to the conduit, wherein the composite floor assembly comprises a surface in contact with the conduit and angled relative to the base rail.

* * * * *